United States Patent [19]

Abukawa et al.

[11] Patent Number: 4,875,539
[45] Date of Patent: Oct. 24, 1989

[54] ELECTRIC POWER STEERING CONTROL SYSTEM

[75] Inventors: Toshimi Abukawa, Hitachiota; Kazuo Tahara, Hitachi; Katsuji Murumoto, Hitachi; Toshiyuki Koterazawa, Hitachi; Mitsuyuki Hombu, Katsuta; Tadashi Takahashi; Shuichi Takamatsu, both of Hitachi; Hisatugu Ishikura, Katsuta; Hiroshisa Yamamura, Hitachiota; Toru Tatsuzaki, Funabashi; Tsutomu Ohmae, Hitachi; Toshiaki Okuyama, Ibaraki; Seizi Yamashita, Katsuta; Shigeki Saito, Katsuta; Masato Sakai, Katsuta, all of Japan

[73] Assignees: Hitachi, Ltd., Tokyo; Hitachi Automotive Engineering Co., Ltd., Katsuda, both of Japan

[21] Appl. No.: 176,151

[22] Filed: Mar. 31, 1988

[30] Foreign Application Priority Data

Mar. 31, 1987 [JP] Japan ................................ 62-78194
Aug. 12, 1987 [JP] Japan ................................ 62-199748

[51] Int. Cl.⁴ ............................................. B62D 5/04
[52] U.S. Cl. .................................... 180/79.1; 318/139
[58] Field of Search ...................... 180/79.1; 318/139; 74/388 PS

[56] References Cited

U.S. PATENT DOCUMENTS

| | | | |
|---|---|---|---|
| 4,471,280 | 9/1984 | Stack | 180/79.1 X |
| 4,530,413 | 7/1985 | Buike et al. | 180/79.1 |
| 4,653,601 | 3/1987 | Nakamura et al. | 180/79.1 |
| 4,673,852 | 6/1987 | Geiger | 318/139 |
| 4,708,220 | 11/1987 | Noto et al. | 180/79.1 X |

FOREIGN PATENT DOCUMENTS

| | | |
|---|---|---|
| 0125918 | 11/1984 | European Pat. Off. . |
| 58-16958 | 1/1983 | Japan . |
| 61-125964 | 6/1986 | Japan . |
| 618754 | 2/1949 | United Kingdom . |

Primary Examiner—John A. Pekar
Attorney, Agent, or Firm—Antonelli, Terry & Wands

[57] ABSTRACT

An electric power steering control system includes an electric motor for producing an assisting torque for the vehicle steering system through a reduction gear, a steering torque sensor fitted on the steering shaft, a controller for controlling the input to the motor in accordance with the torque sensor output, a battery for supplying power to the controller, and a voltage step-up circuit connected to the battery for driving the motor at a voltage higher than the battery voltage. The controller drives the motor at a high voltage.

20 Claims, 9 Drawing Sheets

ELECTRIC POWER STEERING CONTROL SYSTEM

BACKGROUND OF THE INVENTION

This invention relates to an electric power steering control system and, particularly, to an electric power steering control system suitable for providing an electrical assisting force for the automobile steering system.

Conventionally, electrical apparatus equipped on automobiles are supplied with power from their batteries, as described in Japanese Patent Unexamined Publication No. 58-16958. The electrically power-assisted equipment (e.g., power steering and power window) which consumes a relatively large amount of power, although it is in a small duty cycle, is bulky and costly because of the use of high-rated semiconductor devices for controlling a large motor current. As an example of such equipment the power steering system will be described on FIG. 1.

Figure 1:
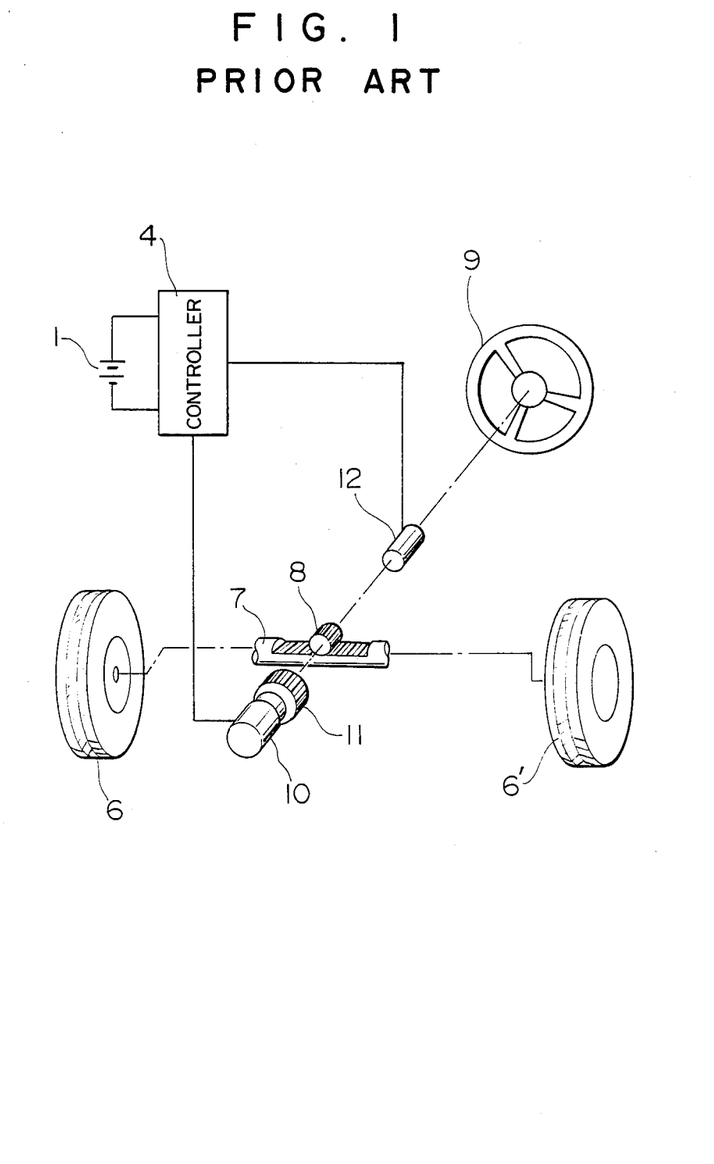
FIG. 1 is a diagram showing the conventional electric power steering control system.

When the driver turns the steering wheel 9, its rotation is transmitted through a torque sensor 12 to a pinion 8, which moves a rack 7 to direct wheels 6 and 6'. In response to the output signal of the torque sensor 12 a controller 4 supplies power from a first battery 1 to a motor 10, which drives the pinion 8 through a gear 11 so that the torque required of the steering wheel 9 is reduced.

The motor 10 is not supplied with a current unless the steering wheel 9 is operated. On the other hand, when the driver turns the steering wheel of a stopped vehicle, the motor 10 demands a maximum current. This current, when supplied from the first battery of 12 volts, is as much as 50-70 amperes for automobiles with engine displacements ranging 1800-2000 cc.

The controller 4 controls the motor current using a semiconductor device, which has a capacity determined from the load current. For controlling a maximum current of 60 amperes, the semiconductor device must have a current rating above 60 amperes. The current control circuit is generally operated in a chopping mode, and therefore the semiconductor device must have a peak current rating which is 1.5-2 times higher than maximum d.c. current rating. Such a semiconductor device with a maximum peak current rating of 120 amperes has considerable dimensions, and it hampers the effort to build a compact and inexpensive controller 4.

In addition, the wiring for connecting the motor 4 to the controller 4 also needs to have a large current capacity, and its weight reaches almost 1 kg. The first battery 1, which also supplies power to the headlight and other light sources, has its terminal voltage varied when the steering wheel 9 is operated, and this adversely results in the fluctuation of light intensity.

The semiconductor device creates voltage drop of at least 0.2-0.5 volt, resulting in a significant power loss for a 12-volt power system.

The power steering system is required to provide a maximum torque for not longer than a few minutes duration, and a small motor can withstand the duty. On the other hand, however, a limitation is imposed on the motor current in order to suppress the voltage variation of the first battery. A large torque output can be produced from a limited current source only by using a large motor 10, and therefore a small motor cannot be used even though it meets the thermal capacity.

Another conventional power steering system has a provision of a second generator besides the main utility generator to obtain a power voltage porportional to the engine speed for use as a power source for the power steering motor through the control in accordance with the output of the steering torque sensor. However, even in this power steering system, the problems as described above in connection with the preceding prior art are left unsolved. Moreover, the power steering system of patent publication No-61-125964 is not designed to operate in high-voltage motor drive and therefore it fails to make the drive components compact. In addition, the power steering system is active only when the engine is running, and it does not assist the driver who is engaged in a desperate struggle in a stalled vehicle to get out of the mud. The second generator varies its output depending on the engine speed, resulting in wide variations in the motor current even after using the current chopping control. Particularly, the system merely provides a deficient assisting force when the engine is idling, and does not provide any assistance once the engine is turned off.

SUMMARY OF THE INVENTION

A primary object of this invention is to provide a power steering control system which operates with a smaller drive current so that the drive components are made compact and reliable.

Another object of this invention is to provide a power steering control system which operates at a high power voltage regardless of whether or not the engine is running.

Still another object of this invention is to provide a power steering control system which uses a low-voltage power source available in the vehicle so that a semiconductor device with a small current capacity can be used, with the intention of achieving a compact overall system including the semiconductor device.

A further object of this invention is to provide a power steering control system which lessens the affect on the main battery voltage so that the fluctuation of light intensity is minimized.

Still a further object of this invention is to provide a power steering control system in which the drive components are separated from the main battery so that they are free from current limitation, with the intention of making the drive motor compact and building a lightweight, inexpensive system.

The aforementioned prior art deficiencies are overcome by the power steering system which includes a first battery, a voltage step-up circuit connected to the first battery, a second battery connected to the output of the voltage step-up circuit, a control circuit connected to the second battery and adapted to produce steering power in proportion to the steering torque signal, and a steering motor connected to the output of the control circuit.

The voltage of the first battery is raised by the voltage step-up circuit and stored in the second battery, which then supplies power to the drive components. The current of the drive components is smaller than they would be if operated in connection with the first battery, and the voltage of the first battery is less affected by the operation of the drive components when they are connected to the second battery.

The above objectives can also be achieved by application of a higher voltage than the vehicle battery voltage to the drive components and charging the battery through a control circuit which includes voltage stepup and step-down abilities. In case the generator has its output voltage equal to the battery voltage, the output voltage is raised and supplied to the control system to achieve the objectives.

When the engine speed is high enough above the idling speed, a high generator output voltage is directly supplied to the drive components, or otherwise the generator voltage is fed through a voltage step-up chopper, and in any case the motor current is smaller in inverse proportion to the supplied voltage.

A 12-volt battery is used for the general loads, and it is charged through a voltage step-down chopper when the generator is of a high-voltage output, or charged directly in the case of a low-voltage generator. The battery voltage is not directly affected by the operation of the power steering system, and the fluctuation of light intensity due to the voltage variation is eliminated.

Although the generator does not provide power for the power steering system during the engine stall, the system is supplied with power from the battery through the voltage step-up circuit, and the system is operative with a small motor current as in the case when the engine is running.

DESCRIPTION OF THE PREFERRED EMBODIMENTS

The present invention will now be described with reference to the drawings.

Figure 2:
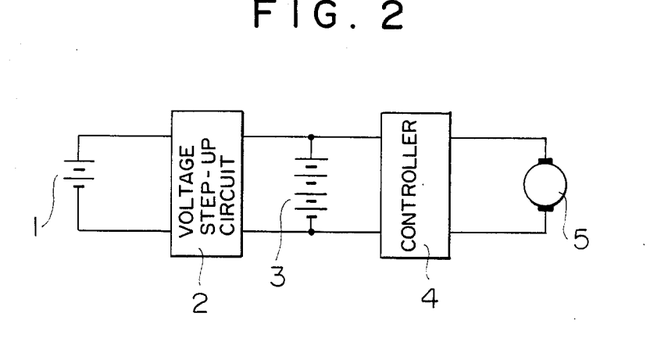
FIG. 2 is a block diagram showing an embodiment of this invention.

FIG. 2 shows in block diagram an embodiment of the invention. In the figure, a first battery 1 supplies its power through a voltage step-up circuit 2 to a second battery 3. The second battery 3 has a connection with a control circuit 4, by which a motor 5 is driven. The first battery 1 is a lead battery used as a main voltage source of the vehicle for supplying power to the loads including various light sources, and it is charged by an engine-driven generator (not shown).

Figure 3:
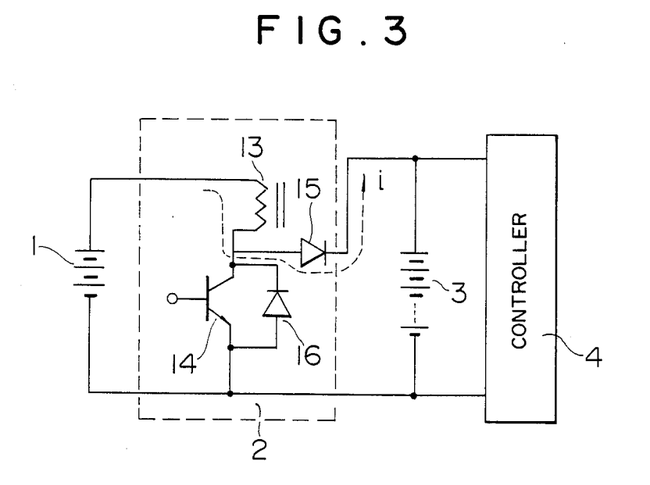
FIG. 3 is a schematic diagram of the voltage step-up circuit in the arrangement of FIG. 2.

Among a variety of voltage step-up circuits 2 a transistor-based voltage step-up circuit is shown in FIG. 3 as an example. In the circuit arrangement of FIG. 3, a lower voltage of the first battery 1 is pumped up to a higher voltage of the second battery 3 through the switching operation of a transistor 14. The transistor 14 operates as a PWM chopper. When the transistor 14 turns on, a current flows in a d.c. reactor (DCL) 13. When the transistor 14 in current conduction is turned off, the current i which has been flowing in the reactor 13 keeps flowing through a diode 15 to the second battery 3 as shown by the dashed line. Consequently, a voltage higher than the first battery voltage is applied to the second battery for charging. The chopping frequency of the transitor 14 is selected lower for a reactor 13 with a large inductance, or selected higher for a reactor with a small inductance. The practical frequency range is in the order of hundreds of Hertz to tens of kilohertz, and a lower frequency is advantageous from the viewpoint of efficiency. The bipolar transistor 14 may be replaced with an FET or any other current switching device.

Figure 4:
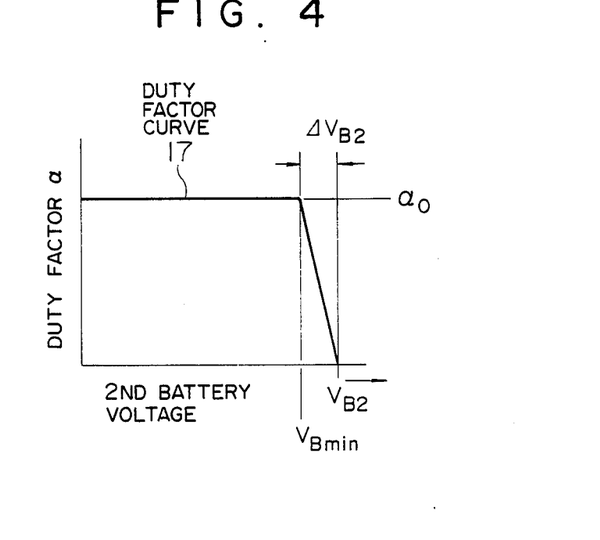
FIG. 4 is a graph showing the duty factor characteristics of the transistor in the voltage step-up circuit.

The transistor current, i.e., the current supplied from the first battery 1 to the second battery 3, is virtually proportional to the duty factor of the transistor 14 in its certain operating range. Accordingly, by setting the duty factor as shown in FIG. 4 for example, the voltage step-up circuit 2 does not operate when the second battery 3 has a sufficiently high voltage. As the voltage of second battery 3 falls, the circuit 2 has its duty factor $\alpha$ increasing so that it supplies an increased current to the second battery 3. In this embodiment, the duty factor has a narrow proportional band of $\Delta V_{B2}$ in terms of the second battery voltage, and it retains a constant duty factor $\alpha_0$ in the range below a voltage $V_{Bmin}$. The current determined from the constant duty factor $\alpha_0$ is the maximum current $I_{max}$ supplied from the first battery 1 to the second battery 3.

The maximum current $I_{max}$ provided by the voltage step-up circuit 2 is determined such that the resulting power dissipation is greater than an average power exerted by the controller 4 to drive the motor 5 and smaller than the maximum power. For example, a motor with an efficiency of 50% and a maximum output of 300 watts demands about 60 amperes in the 12-volt power system, and the above-mentioned maximum current is set to a 50% level, i.e., 30 amperes. Accordingly, the load to the first battery 1 is halved even at the maximum level as compared with the conventional case of 60-ampere range, and the voltage variation ca be reduced. In addition, the switching transistor 14 in the voltage step-up circuit also suffices to have a half capacity as compared with the conventional 60-ampere rating, allowing the use of less expensive transistors. Generally, the smaller the power rating of a transistor, the greater the number of pieces of production, and owing to the mass producing effect a half-rated transistor costs actually less than half as much as a full-rated transistor.

Figure 5:
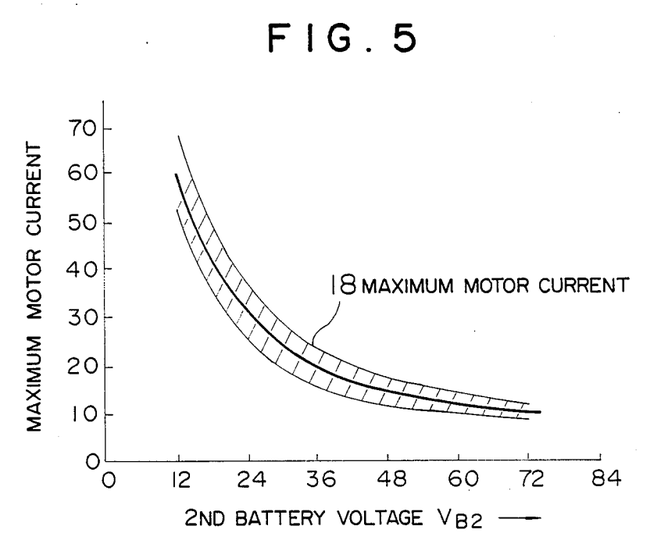
FIG. 5 is a graph showing the relation between the battery voltage and the maximum motor current in the arrangement of FIG. 2.

The voltage of the second battery 3 in FIG. 2 can be chosen arbitrarily. FIG. 5 shows in graph form the motor current necessary to assist the steering operation for a 1800 cc. class automobile. The maximum current of the motor 5 is plotted on the vertical axis against the voltage of the second battery 3 on the horizontal axis. For example, if the battery voltage is selected to 24 volts, the maximum motor current ranges 25–35 amperes, or for a 60-volt battery, the maximum motor current is 10-14 amperes. It means that the higher the second battery voltage is, the smaller maximum motor current is needed. In this embodiment, the second battery voltage is selected to be at least twice the first battery voltage. For the majority of automobiles having a 12-volt power system, the second battery voltage is set to 24 volts or higher. Although the higher the operating voltage is, the smaller semiconductor device the controller 4 can use and thus the less the controller costs, a voltage which is too high will result in an increased cost for dealing with the security and insulation. Therefore, the voltage is determined from a global viewpoint. The use of a high power voltage is advantageous in designing the controller 4 for the motor 5. The reason is that the conventional controller has been required to include as small a number of power semiconductor devices as possible due to their high cost, whereas this restriction is removed by the use of low-rated inexpensive semiconductor devices.

Figure 6:
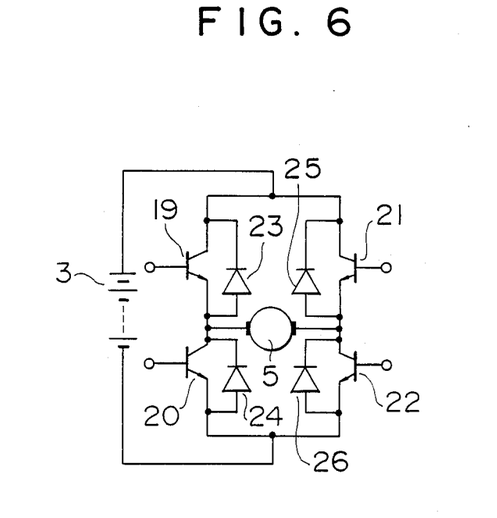
FIGS. 6 and 7 are schematic diagrams of the motor drive circuits.

The controller 4 has a main circuit as shown i FIG. 6 for example. The arrangement is to drive a magnet field motor or a shunt motor. The motor 5 has two current direction modes, one by turning on transistors 19 and 22, the other by turning on transistors 21 and 20, so that it rotates in both selected directions. The motor 5 is rendered current control or output torque control through the chopping control for the conductive state of the transistors 19–22. The arrangement of FIG. 6 has an advantage of fast motor current response.

Figure 7:
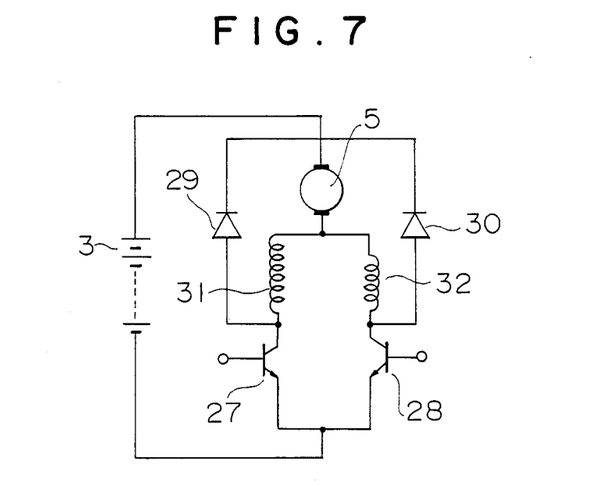

FIG. 7 shows an example of the circuit arrangement for controlling a series-wound motor, in which field windings 31 and 32 are wound in opposite directions so that the motor 5 rotates in opposite directions in response to the conduction of a transistor 27 or transistor 28. It is also possible to use an a.c. motor instead of a d.c. motor.

The function of the electric power steering system is to drive the motor 5 in response to a signal provided by a torque sensor or the like so as to reduce the steering force applied through the steering wheel 9, and its circuit arrangement can be chosen arbitrarily. In any case, the motor 5 needs a certain power supply so that it is driven. The motor current can be reduced using a higher supply voltage, and a smaller motor current allows the use of a less capacious current control semiconductor device.

Figure 8:
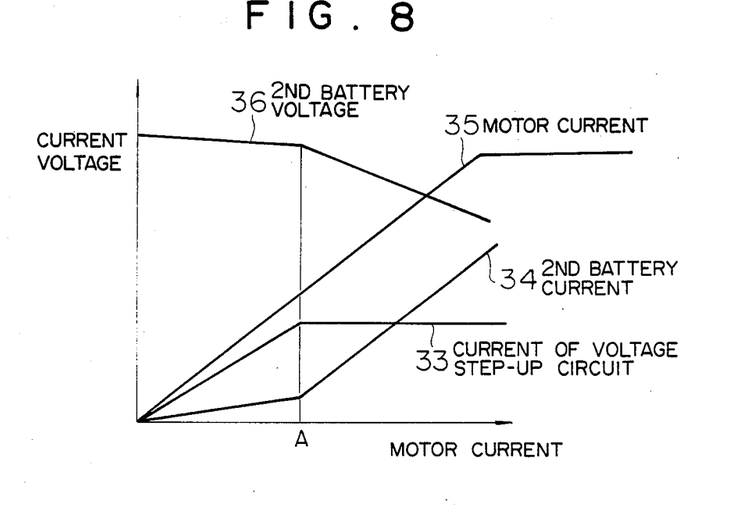
FIG. 8 is a graph showing the current in the voltage step-up circuit, the battery current and the battery voltage with respect to the motor current.

FIG. 8 shows various electrical values with respect to the motor current for the foregoing circuit arrangement. The voltage step-up circuit 2 has its output current increasing as the current supplied to the motor 5 increases, and it becomes constant above point A of the motor current. This is the maximum output current of the voltage step-up circuit 2. The current supplied by the second battery 3 increases progressively as the motor current increases in its small load section, and it increases sharply above the point A of the motor current. On the graph, the curve 33 represents the current supplied from the voltage step-up circuit 2, and the curve 34 represents the current supplied from the second battery 3 to the motor 5. The sum of these currents gives the motor current 35. The voltage of the second battery 3 varies as shown by the curve 36. Shown in FIG. 8 is the case when the second battery 3 has been fully charged at the beginning. As the battery voltage falls, the output current of the voltage step-up circuit 2 moves from the curve 33 to the left.

As will be appreciated from the above description and FIG. 8, the motor is supplied with power of stepped-up voltage derived from the first battery (e.g., until the motor current reaches the 12-volt battery) point A, and for a greater current demand the increasing load current component is supplied from the second battery so that the first battery is relieved of it. The output current of the first battery is smaller than the maximum motor current, and this is advantageous for lowering the current rating of the semiconductor devices used in the voltage step-up circuit and also in minimizing the voltage variation of the first battery. As a result of reduced first battery voltage variation, the fluctuation of light intensity can virtually be eliminated. Since the motor 5 is supplied with power for its high-level portion in a short period primarily from the second battery 3, the voltage of the first battery does not fall significantly, and therefore the motor 5 can be operated up to its load limit zone. Accordingly, a higher assisting output can be drawn from a motor with a given rating, or a smaller motor can be used to achieve a given assisting force. As a result, the cost of the power steering system can be lowered, and as a result of higher second battery voltage the controller can be built using less expensive semiconductor devices.

This embodiment is different from the scheme of simply raising the battery voltage to charge a capacitor. Instead, the second battery 3 is designed to store power from the voltage step-up circuit 2, and the system operates as if it is separated from the first battery 1. Accordingly, even if the load current for the motor 5 varies to a great extent, the voltage of the first battery is prevented from varying significantly.

According to this embodiment, the voltage step-up circuit raises the voltage of the first battery to store its power in the second battery, which then supplies its power to the load. The load current supplied by the higher voltage source is smaller than would be supplied directly from the first battery, whereby the semiconductor current control devices and steering motor driven by it can have lowered current ratings, weights and sizes, and their cost can be reduced. As an additional measure of effectiveness, the operation of the power steering system does not incur a significant voltage variation of the first battery, and the light sources powered by the first battery can be prevented from fluctuating in their intensity.

The following describes several other embodiments of this invention with reference to FIGS. 9 through 12.

Figure 9:
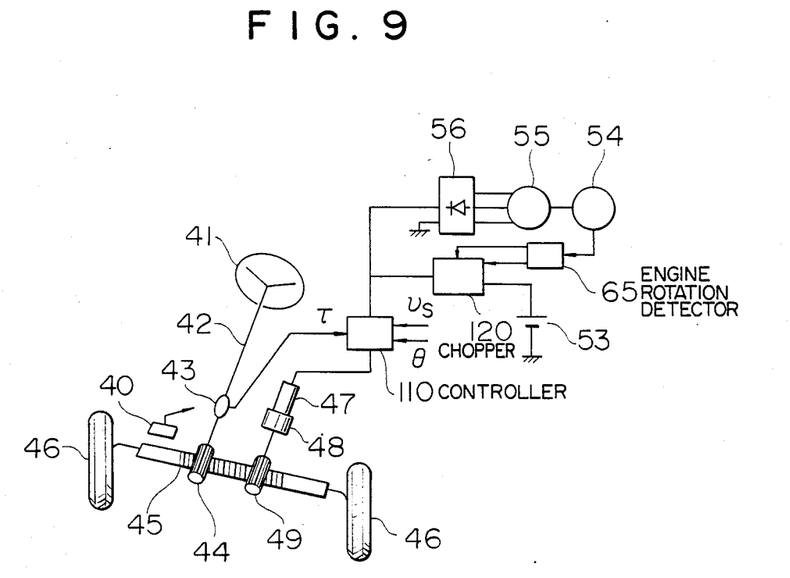
FIG. 9 is a diagram showing the overall system arrangement according to another embodiment of this invention.

FIG. 9 shows the arrangement of the electric power steering control system embodying this invention. Indicated by 41 is a steering wheel, 42 is a shaft of the steering wheel, 43 is a torque sensor, 44 is a pinion, 45 is a rack, 46 are wheels of vehicle used for steering, 47 is a power assisting motor, 48 is a reduction gear, 49 is a pinion, 40 is a steering angle sensor using a magnetic Hall element, for example, 110 is a power steering controller (will be termed simply "controller"), and 120 is a voltage step-up/down chopper circuit used for charging a battery 53 in voltage step-down mode and also supplying power from a battery 53 to the power steering system in voltage step-up mode when the engine is not running, with the voltage up/down mode being determined depending on whether the engine is running or not as detected by an engine rotation detector 65. A charging generator 55 is driven by the engine 54 through a belt or the like. The generator 55 produces a d.c. voltage output with an intended voltage through a full-wave rectifier 56.

This embodiment is applied to the rack-pinion steering system, in which the driver applies a steering force to the steering wheel 41 and it is transmitted through the shaft 42 and torque sensor 43 to the pinion 44. The torque sensor 43 produces a signal $\tau$ representing the steering torque. The torque sensor 43 is of a strain gauge type or torsion type with a variable resistor. The motor 47 serves for the electrical actuator for providing an assisting steering force to the rack 45 through the reduction gear 48 and pinion 49. The steering angle sensor 40 produces a signal which is zero when the vehicle's wheels are in a straight-run, or neutral, state. An example of the steering angle sensor 40 is a linear encoder attached to the rack. The steering motor 47 is selected from a d.c. motor, brushless d.c. motor and induction motor. The controller 110 is designed to control the application voltage or current to the motor in accordance with the vehicle speed vs, steering torque $\tau$ and steering angle $\theta$.

Figure 10:
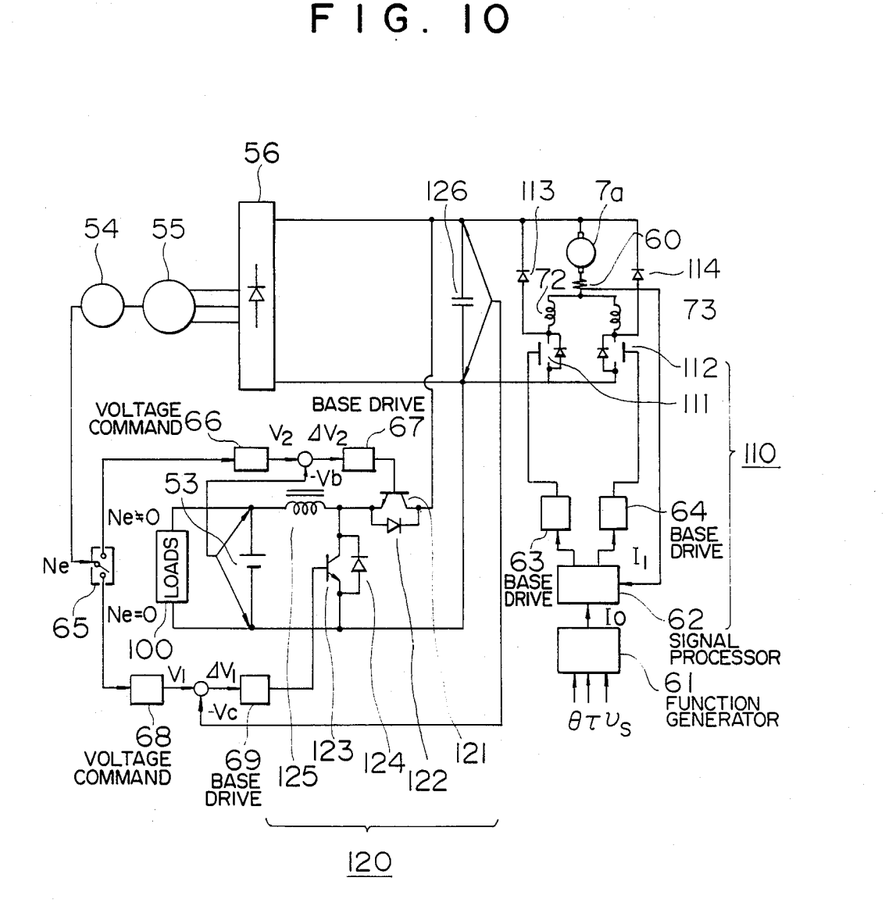
FIG. 10 is a block diagram showing in detail the control circuit and voltage step-up circuit.

FIG. 10 shows in block diagram the arrangement of the main circuit and control circuit which operate in a mode in which the charging system including the engine 54, charging high-voltage generator 55 and rectifier 56 drives a d.c. motor 7a having a forward and reverse field windings through a capacitor 126, and in a mode in which the charging system charges the battery 53 through a voltage step-down chopping transistor 121 or inversely the circuits operates with a reactor 125 and voltage step-up chopping transistor 123 so that the power steering system is active even if the engine 54 stalls.

Described first in the following is the case when th engine key is set to the IGNITION position (not shown) and the engine is in a halt state. The engine speed Ne is detected and indicated to the engine rotation detector 65, which provides an output to a voltage command circuit 68 constituting a voltage stepup chopping control circuit in response to the detection of Ne=0. The voltage command circuit 68 subtracts a detected terminal voltage Vc of the smoothing capacitor 126 (e.g., 12 vdc) from the voltage command $V_1$, supplies a resulting differential command signal $\Delta V_1 = V_1 - Vc$ to a base drive circuit 69 for the transistor 123. The base drive circuit 69 operates the transistor on and off so that the battery voltage is stepped up in the circuit including the reactor 125, transistor 123 and flywheel diode 124 until $\Delta V_1$ becomes zero, and the capacitor 126 is charged through the flywheel diode 122 to the voltage equal to the output voltage (e.g., 48 volts) of the high-voltage charging generator 55. This voltage is maintained constant.

In this state, when the steering wheel 1 is operated, the torque sensor 3 provides a torque signal $\tau$ to a function generator 61, which provides a drive signal to one of the base drive circuits 63 and 64 depending on the polarity of the torque signal $\tau$. In response to the drive signal, a forward transistor 111 or reverse transistor 112 operates in chopping mode to drive the d.c. motor 7a, which then produces an assisting steering force. When the vehicle has been brought to a stop and the engine has been turned off, the same operation as described above takes place by operating the steering wheel, provided that the engine key is placed at the IGNITION position.

Figure 11:
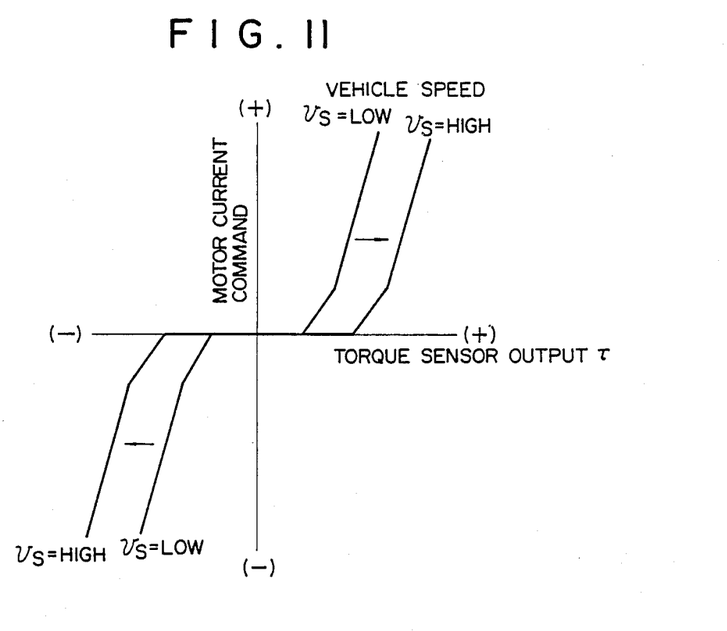
FIG. 11 is a graph showing the motor current command value with respect to the steering torque sensor output.
Figure 12:
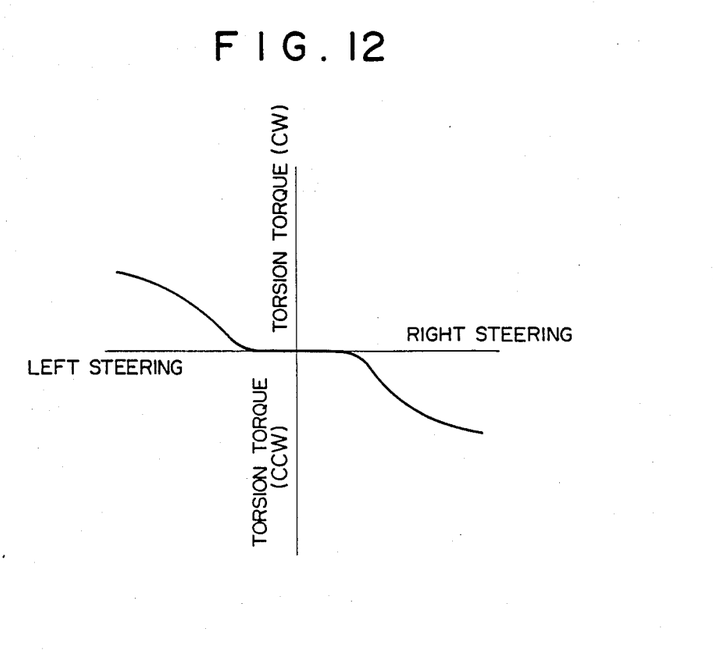
FIG. 12 is a graph showing the steering wheel return torque with respect to the steering angle.

Next, the operation after the engine has been started will be described. The engine rotation detector 65 detects the state of Ne≠0, and it is indicated to the voltage step-down chopping voltage command circuit 66, which subtracts a detected battery voltage Vb from the voltage command $V_2$ (e.g., 48 vdc) and supplies a resulting difference $\Delta V_2 = V_2 - Vb$ to the base drive circuit 67 for the voltage step-down transistor 121. In response to the $\Delta V_2$ voltage command the base drive circuit 67 operates the transistor 121 in chopping mode to produce a charging current for the battery 53. If the steering wheel 41 is operated at this time, the torque sensor 43 provides an output to the function generator 61 in the same way as the preceding case. The function generator 61 produces a current command $I_0$ in accordance with the input torque signal and supplies it together with a polarity signal to a signal processing circuit 62. The circuit 62 performs subtraction for the current command $I_0$ and detected motor current $I_1$, and drives one of the transistor 63 and 64 in chopping mode depending on the detected torque polarity, thereby driving the d.c. motor 7a to produce an assisting steering force. The motor current command is set with respect to the torque sensor output, with the vehicle speed vs being a parameter, on the function generator 61, as shown in FIG. 11. By preparing a function of the return torque vs. steering angle as shown in FIG. 12, the power steering system can have the necessary characteristics.

Figure 13:
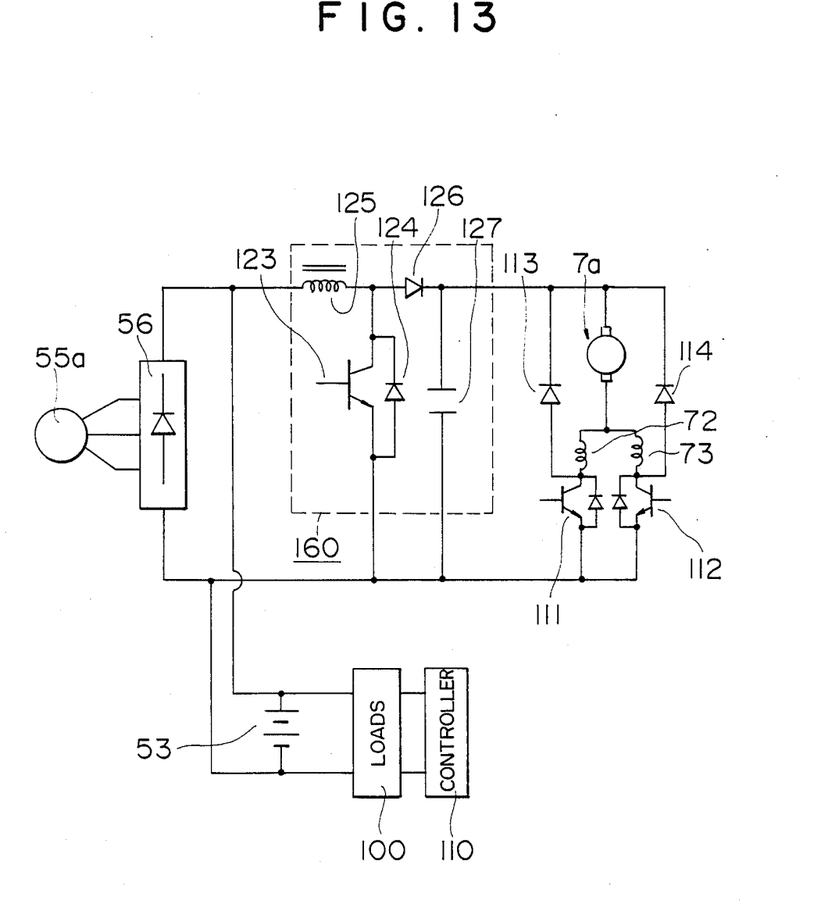
FIG. 13 is a schematic diagram showing another embodiment of this invention.

FIG. 13 shows another embodiment of this invention, in which a low-voltage (e.g., 12 volts) charging generator is used. In the figure, the charging generator 55a has its armature winding (not shown) wound to meet low-voltage specifications, and its a.c. output is rectified by a rectifier 56 to produce a d.c. output with a rated low d.c. voltage. The d.c. output is used to charge the battery 53 directly and also supplied to the controller and other general loads 100. The low-voltage output is further fed to the motor 7a through a voltage step-up chopper 160 which consists of a reactor 125, transistor 123, feedback diode 124, diode 126 and smoothing capacitor 127. After the engine has been started, the voltage step-up chopper 160 operates as the switching operation of the transistor 123 in unison with the reactor 125 to convert the low voltage into a high voltage (e.g., 48 volts) to be supplied to the motor 7a. When the engine is in a halt state, the charging generator 55a does not provide an output, but the voltage of the battery 53 is stepped up by the chopper 160 and supplied to the motor 7a as in the case of a running engine Depending on the signal from the controller 110, one of forward or reverse transistors operates in chopping mode to drive the motor 7a, which then produce an assisting steering force in the same way as described on FIG. 10.

Figure 14:
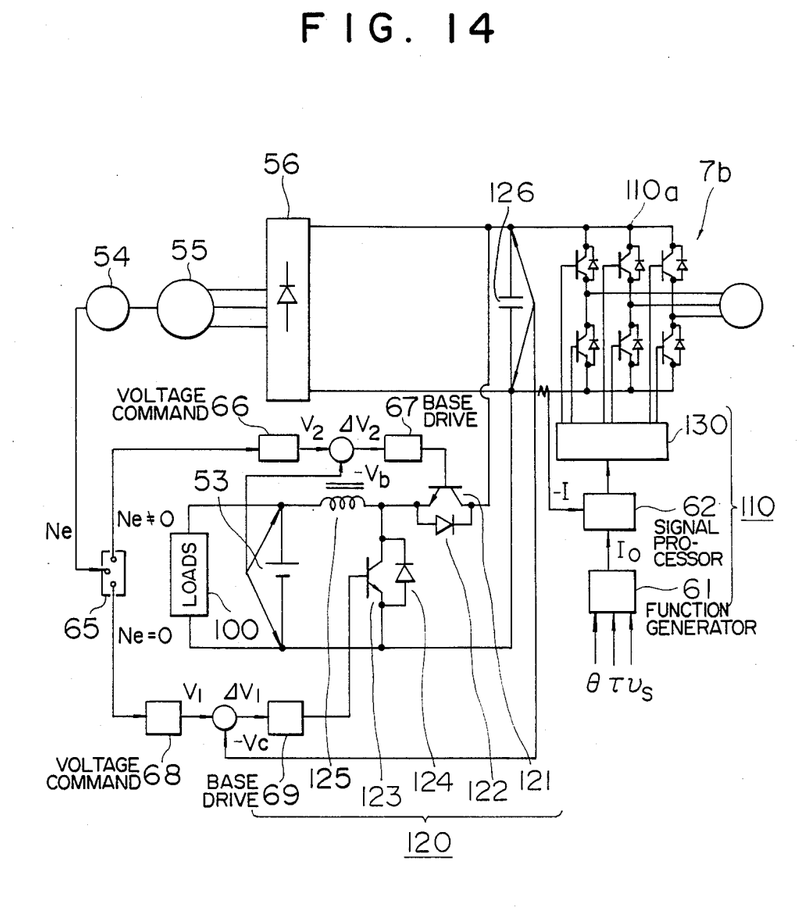
FIG. 14 is a schematic diagram showing still another embodiment of this invention.

FIG. 14 shows the arrangement using a brushless d.c. motor or induction motor 7b in place of the d.c. motor 7a in FIG. 10. The controller for controlling the motor speed and output torque has its main circuit 110a configured in a transistor inverter. A base drive circuit 130 is a signal processing circuit having a polarity discriminating function and subtracting function for the current command and detected current, and it supplies base currents to the transistors of the inverter circuit to drive the motor 7b in the forward or reverse direction, thereby producing an assisting steering force. Obviously, the main circuit of the controller shown in FIG. 13 may be configured with a transistor inverter, with the d.c. motor 7a being replaced with a brushless d.c. motor or induction motor.

In the embodiments, the ratio of the high-voltage to the battery voltage supplied to the steering motor can be chosen arbitrarily, and raising the ratio can further reduce the motor current.

Although in the embodiments, the high-voltage system is loaded only by the power steering system, the equipment, except for light sources and general loads, such as the ignition system, ultrasonic atomizer and other utility motors may be connected to the high-voltage system.

In the embodiments, the charging motor has its armature winding configured to meet either high-voltage or low-voltage specifications. In the former case, the generator output is directly supplied to the power steering system, and in the latter case, the low-voltage generator output is converted to a high voltage by the voltage step-up chopper and supplied to the steering system. With the engine running, the high-voltage generator output is stepped down by the chopper to charge the battery, or the low-voltage is directly connected to the battery for charging. When the power steering system is operated, with the engine halting, the battery output (12 volts in standard) is stepped up to a high voltage by the chopper and supplied to the power steering system. Since general loads including the headlight and other light sources are supplied with power from a battery, the voltage is not varied by the operation of the power steering system, and therefore the light intensity does no decrease. Although the battery voltage will fall slightly when it is supplied to the power steering system during engine halt with the intention of getting out of the mud or turning the wheels at stoppage, such a slight reduction in light intensity will not be serious for the stopping vehicle.

The high-voltage setting for the input to the power steering system makes its current smaller, which allows the motor current switching devices to have a smaller current rating, resulting in a compact and economical design. A smaller load current is also advantageous in having a smaller wiring, smaller resistive power loss and smaller heat generation in the vehicle engine room.

According to the embodiments the power steering system is supplied with a voltage which is higher than a vehicle battery voltage, and the battery is charged through the control circuit including a voltage step-up/down abilities, whereby the system operates in small-current mode and a compact and reliable control system is attained.

I claim:

1. An electric power steering control system comprising an electric motor which provides an assisting force for a steering system of a vehicle through a reduction gear; a torque sensor which is fitted on a steering shaft for detecting the steering torque; a controller which controls the input to said motor in accordance with the output of said torque sensor; a battery which supplies power to said controller; and a voltage step-up means which is connected to said battery for driving said motor at a voltage higher than the voltage of said battery.

2. An electric power steering control system according to claim 1, wherein said motor comprises a d.c. motor.

3. An electric power steering control system according to claim 1, wherein said motor comprises a brushless d.c. motor.

4. An electric power steering control system according to claim 1, wherein said motor comprises an induction motor.

5. An electric power steering control system according to claim 1, wherein said voltage step-up means includes at least a transistor and a d.c. reactor, said transistor having a duty factor controlled by said controller.

6. An electric power steering control system according to claim 1 further comprising a high-voltage battery which is charged at a voltage higher than the voltage of said battery, said motor being driven by the outputs of said voltage step-up means and said high-voltage battery.

7. An electric power steering control system according to claim 6, wherein said controller operates on said voltage step-up means to supply more current than a current from said high-voltage battery to said motor in a motor current range at and below a predetermined level, and to supply a virtually constant current to said motor in a motor current range above said level so that said high-voltage battery supplies an increased current to said motor.

8. An electric power steering control system according to claim 1 further comprising a high-voltage generator which is driven by the engine of said vehicle to generate a voltage higher than the voltage of said battery and a sensor which detects whether said engine is running or halting, said motor being driven by said voltage step-up means when said sensor has detected a halt state of said engine.

9. An electric power steering control system according to claim 8, wherein said motor is driven by said high-voltage generator, said high voltage generator having a high output voltage stepped down by a voltage step-down means so as to charge said battery.

10. An electric power steering control system according to claim 1 further comprising a low-voltage generator which is driven by the vehicle's engine for generating a low voltage virtually equal to the voltage of said battery, said voltage step-up means being connected to said battery and said low-voltage generator.

11. A power supply for a power-assisted steering system comprising: a first battery; a voltage step-up means connected to said first battery; a second battery connected to the output of said voltage step-up means; a control circuit connected to said second battery and adapted to produce electric power for steering in response to a steering torque signal; and a steering motor connected to the output of said control circuit to receive said steering power.

12. A power supply for a power-assisted steering system according to claim 11, wherein said voltage step-up means has an output capacity greater than an average output power of said control circuit for driving said motor and smaller than a maximum output power of said control circuit for driving said motor.

13. An electric power steering control system comprising: a motor which provides an assisting torque for the steering system of a vehicle through a reduction gear; a controller which controls the input to said motor in accordance with the output of a torque sensor fitted on a steering shaft; a battery which supplies power to said controller; and a generator which charges said battery, said generator having an output voltage set higher than the voltage of said battery, said generator supplying power, with a voltage higher than said battery voltage, to said motor when the engine of said vehicle is running, said battery supplying power through a voltage step-up circuit to said motor when said engine is halting.

14. An electric power steering control system according to claim 13, wherein said voltage step-up circuit is controlled by an output signal from means of detecting a halt state of said engine.

15. An electric power steering control system comprising: a motor which provides an assisting torque for the steering system of a vehicle through a reduction gear; a controller which controls the input to said motor in accordance with the output value of a torque sensor fitted on a steering shaft; a battery which supplies power to said controller; and a generator which charges said battery, said generator having an output voltage set higher than the voltage of said battery, said generator supplying power, with a voltage higher than said battery voltage, to said motor through said controller and, at the same time, charging said battery through a voltage step-down circuit when the engine of said vehicle is running, said battery supplying power to said controller through a voltage step-up circuit when said engine is halting.

16. An electric power steering control system according to claim 15, wherein said voltage step-up and step-down circuit comprises a chopper circuit which is switched to a step-up mode or step-down mode depending on whether said engine is running or halting.

17. An electric power steering control system according to claim 15 wherein said voltage step-up and step-down circuit is operated in step-down chopping mode in response to an engine rotation signal ((Ne≠0) so that the output voltage of said generator is controlled to a battery charging voltage and used to charge said battery, the high output voltage of said generator being used directly as a power source for said power steering system.

18. An electric power steering control system comprising:
a motor which provides an assisting torque for the steering system of a vehicle through a reduction gear;
a controller which controls the input power to said motor in accordance with the output value of a torque sensor fitted on a steering shaft;
a voltage step-up means for stepping up the voltage of power supplied to said motor;
a battery which supplies power to said voltage step-up means, said controller and to additional loads which operate at a voltage different than said motor; and
a charging generator, said generator producing an output power used for charging said battery and, after the voltage is stepped up by said voltage step-up means, supplied to said motor based upon a control signal from said controller.

19. An electric power steering control system according to claim 18, wherein the voltage of said battery is stepped up by said voltage step-up means and supplied to said motor when said 20. An electric power steering control system comprising an electric motor which provides an assisting force for a steering system of a vehicle through a reduction gear; a torque sensor which is fitted on a steering shaft for detecting the steering torque; a controller which controls the input to said motor in accordance with the output of said torque sensor; a battery which supplies power to said controller; and a voltage step-up means which is connected to said battery for driving said motor at a voltage higher than the voltage of said battery, thereby minimizing the fluctuation of light intensity.

* * * * *